United States Patent [19]

Dittmar et al.

[11] Patent Number: 4,533,537
[45] Date of Patent: Aug. 6, 1985

[54] PROCESS OF PRODUCING SULFURIC ACID

[75] Inventors: Heinz Dittmar, Friedberg; Manfred Beckmann, New Isenburg; Karl-Heinz Dörr, Mainz; Ulrich Rothe, Frankfurt am Main; Ulrich Sander, Friedrichsdorf, all of Fed. Rep. of Germany

[73] Assignee: Metallgesellschaft Aktiengesellschaft, Frankfurt am Main, Fed. Rep. of Germany

[21] Appl. No.: 519,958

[22] Filed: Aug. 3, 1983

[30] Foreign Application Priority Data

Aug. 12, 1982 [DE] Fed. Rep. of Germany ....... 3230003
Sep. 1, 1982 [DE] Fed. Rep. of Germany ....... 3232446

[51] Int. Cl.³ .................... C01B 17/82; C01B 17/74
[52] U.S. Cl. ................... 423/522; 423/533; 422/160; 422/161
[58] Field of Search ............... 423/522, 533, 423/531; 422/160, 161, 201; 296/6

[56] References Cited

U.S. PATENT DOCUMENTS

| 800,127 | 9/1905 | Frasch | 299/6 |
| 2,023,203 | 12/1935 | Merrian | 423/533 |
| 2,109,611 | 3/1938 | Axelrad | 299/6 |
| 2,528,103 | 10/1950 | Willson | 106/103 |
| 3,307,921 | 3/1967 | Junginer | 423/533 |
| 3,374,061 | 3/1968 | Topsoe et al. | 423/533 |
| 4,123,107 | 10/1978 | Bryant, Jr. et al. | 423/522 |
| 4,241,953 | 12/1980 | Bradford et al. | 299/6 |
| 4,276,116 | 6/1981 | Blumrich et al. | 423/531 |
| 4,312,842 | 1/1982 | Wilson et al. | 423/522 |
| 4,330,364 | 5/1982 | Blumrich | 423/522 |

FOREIGN PATENT DOCUMENTS

| 1146722 | 5/1983 | Canada | 423/522 |
| 2529709 | 1/1977 | Fed. Rep. of Germany | 423/522 |
| 2700009 | 7/1978 | Fed. Rep. of Germany | 423/522 |
| 1553307 | 9/1979 | United Kingdom | 423/522 |
| 1554764 | 10/1979 | United Kingdom | 423/522 |

OTHER PUBLICATIONS

Sander et al., Waste Heat Recovery in Sulfuric Acid Plants, CEP Mar. 1977, pp. 61–64.
Olsen, J. C., Unit Processes & Principles of Chemical Engineering, D. Van Nostrand Co., NY, NY, 1932, pp. 1–3.

Primary Examiner—Gary P. Straub
Attorney, Agent, or Firm—Sprung, Horn, Kramer & Woods

[57] ABSTRACT

The $SO_2$ content of gases is catalytically reacted to form $SO_3$. The $SO_3$-containing gases are cooled in a plurality of stages with a cooling fluid (A) before the $SO_3$ is absorbed. The absorbing acid is cooled by a cooling fluid (B) which delivers heat to a consumer. To increase the temperature of the cooling fluid (B) or to reduce the expenditue and to prevent a temperature drop in the $SO_3$-containing gases below the dew point temperature, the $SO_3$-containing gases are cooled first by and indirect heat exchange and then by a second indirect heat exchange with a cooling fluid (A) to a temperature slightly above the dew point temperature of the $SO_3$-containing gases. The cooling fluid (A) is conducted in a closed cycle. The sulfuric acid circulated through the absorber is cooled by an indirect heat exchange with a liquid cooling fluid (B), which is conducted in a closed cycle. The liquid cooling fluid (B) which has been heated is heated further by an indirect heat exchange with the heated cooling fluid (A). The hot cooling fluid (B) is cooled by an indirect heat exchange with the consumer.

20 Claims, 5 Drawing Figures

PROCESS OF PRODUCING SULFURIC ACID

BACKGROUND OF THE INVENTION

1. Field of the Invention

This invention relates to a process of producing sulfuric acid from $SO_2$-containing gases comprising a catalytic reaction to convert $SO_2$ to $SO_3$, a multi-stage cooling of the $SO_3$-containing gases before an absorption of $SO_3$ in concentrated sulfuric acid, a transfer of heat from the sulfuric acid circulated through the absorber to a cooling fluid by an indirect heat exchange, a circulation of the cooling fluid, and a transfer of heat from the cooling fluid cycle to a consumer by an indirect heat exchange.

2. Discussion of Prior Art $V_2O_5$ catalysts are employed in practice for the catalytic reaction by which $SO_2$ is converted to $SO_3$. Because the reaction is exothermic, it raises the temperature of the gases. The absorption of the resulting $SO_3$ in concentrated sulfuric acid is also an exothermic process and the heat of absorption which is liberated must be dissipated. For reasons of heat economy, it is important to utilize the surplus heat which becomes available. As that heat becomes available in part at relatively low temperatures, the economically useful utilization of that heat is difficult. Additionally, it must be ensured that the temperature of the $SO_3$-containing gases will not drop below the dew point temperature before said gases enter the absorber because even dried contact process gases still have a small moisture content. This applies to the interstage absorption and to the final absorption. It is known that the $SO_3$-containing gases leaving the first contact process stage can be cooled in two stages before the interstage absorption. The first stage involves a heat exchange with the colder gases leaving the interstage absorption, and the second stage involves a heat exchange with feed water (German Patent Specification No. 1,186,838, German Patent Specification No. 1,567,672).

From German Patent Specification No. 2,529,709 and Laid-open German Applications Nos. 2,529,708 and 2,824,010 (U.S. Pat. No. 4,276,116) it is known to dissipate heat from the acid cycles of the absorbers by an indirect heat exchange with dilute sulfuric acid or phosphoric acid. The heat exchange may be effected through the intermediary of a closed cycle of a cooling fluid consisting of water, oil or other fluids. A relatively high temperature of the cooling fluid involves a relatively high expenditure regarding the acid-cycle heat exchanger. When the $SO_3$-containing gases are cooled in two stages before entering the absorber, the temperature may drop below the dew point temperature if the heat of the gases is used to a large extent to heat the cooling fluid.

It is an object of this invention to increase (in the closed heat transfer cycle between the absorber acid and the consumer the temperature of the liquid cooling fluid) or to achieve approximately the same temperature with a lower expenditure in such a manner that surplus heat from the contact process system is utilized and it is ensured that the temperature of the $SO_3$-containing gases does not drop below the dew point temperature.

SUMMARY OF INVENTION

This object is accomplished in accordance with the invention in that the $SO_3$-containing gases before entering the absorber are first cooled by an indirect heat exchange and are subsequently cooled to a temperature slightly above the dew point temperature, e.g. 20° to 60° C. above the dew point of the $SO_3$-containing gases by an indirect heat exchange with a cooling fluid (A), which is conducted in a closed cycle, the sulfuric acid circulating through the absorber is cooled by an indirect heat exchange with a liquid cooling fluid (B), which is conducted in a closed cycle, the liquid cooling fluid (B) which has been heated is heated further by an indirect heat exchange with the heated cooling fluid (A), and the hot cooling fluid (B) is cooled by an indirect heat exchange with the consumer.

The $SO_2$-containing gases used as a feedstock may be dry or moist. $SO_3$ is always absorbed after the last contact process tray. An interstage absorption may also be carried out. Any interstage absorption is usually effected after the first contact process stage whereas the final absorption is effected after the second contact process stage. Alternatively, each of first and second contact process stages may be succeeded by an interstage absorption and a third contact process stage may be followed by the final absorption. The procedure according to the invention may be adopted in conjunction with the interstage absorption or the final absorption or with both absorptions. In the latter case, the liquid cooling fluids used between the absorbers and the consumer are conducted in separate cycles if the acids in the interstage and end absorbers are at about the same temperature.

If the acid in the final absorber is at a lower temperature, the liquid cooling fluid (B) may be conducted first through the heat exchanger for cooling the acid from the final absorber and then through the heat exchanger for cooling the acid from the interstage absorber. Thereafter a partial stream of the heated cooling fluid (B) may be heated further by the cooling fluid (A) associated with the interstage absorber, another partial stream may be heated further by the cooling fluid (A) associated with the final absorber and both partial streams may subsequetly be combined.

Alternatively, the entire cooling fluid (B) which has been heated may be heated further by only one cooling fluid (A) or by both cooling fluids (A) in succession. The liquid cooling fluid (B) may consist of water under pressure or of other liquids, such as oil. The cooling fluid (A) may also consist of liquids or of gases.

The consumer may consist of processes in which heat is required only at the existing temperature level or at a higher temperature level, which is achieved by a further heating.

In the processing of $SO_2$-containing gases which become available at a low temperature, the first cooling stage for cooling the $SO_3$-containing gases before the absorption will effect a heating of $SO_2$-containing gases before the catalytic reaction. If said cooling stage is associated with an interstage absorption, the hot $SO_3$-containing gases leaving the contact process vessel are usually cooled by a heat exchange with the colder gases leaving the interstage absorber so that the latter gases are heated to the operating temperature of the next following contact process tray.

In the processing of $SO_2$-containing gases which become available at an elevated temperature, e.g., as a result of a sulfur-burning process, the procedure described hereinbefore is generally carried out in the first cooling stage preceding an interstage absorption. A final absorber is usually preceded by feed water preheaters. The rate at which the cooling fluid is circulated in cycle (A) is automatically controlled in such a manner that the resulting temperature of said cooling fluid ensures a maximum extraction of heat whereas the temperature does not drop below the dew point temperature of the gases. The heat exchangers may be used in countercurrent or co-current operation.

According to a preferred feature, the liquid (B) consists of pressurized water. This ensures a high heat transfer coefficient with low expenditure. Such a high pressure is maintained in the cooling cycle that the heating does not result in evaporation. The water is generally under 1.2 to 5 atmospheres absolute pressure.

According to a further preferred feature the cooling fluid (A) consists of pressurized water. The pressure in the cooling cycle may be maintained at such a value that the heating does not result in an evaporation of water or result in a complete evaporation. Cooling fluid (A) can be under a pressure of 1.2 to 12 atmospheres absolute pressure. The heat content of the steam can be entirely used to hear the cooling fluid (B).

According to a further preferred feature the pressurized water used as cooling fluid (A) is entirely evaporated by the indirect heat exchange and the steam is condensed by the indirect heat exchange with cooling fluid (B). In this way the rate at which the cooling fluid (A) is circulated by a pump may be substantially decreased and the pump energy can be correspondingly reduced.

According to a further preferred feature the pressurized water used as cooling fluid (A) is entirely evaporated by the indirect heat exchange, the steam is condensed by a heat exchange with a second consumer, and the hot condensate is used to heat the cooling fluid (B). As a result, part of the heat of cooling fluid (A) can be used on a higher temperature level.

According to a further preferred feature the cooling fluid (A) is supplied at a temperature of 120° to 180° C. to the indirect heat exchange with the $SO_3$-containing gases and is conducted countercurrently to the latter. This results in a high heat transfer rate and ensures that a condensation of sulfuric acid in the gas stream before entering the $SO_3$ absorber is reliably avoided.

According to a further preferred feature, the final absorption is effected at a low temperature, the cooling fluid (B) is heated by the sulfuric acid circulated through the interstage absorber and is subsequently heated further with the cooling fluid (A) associated with the end absorber and with the cooling fluid (A) associated with the interstage absorber. The cooling fluid can thus be heated in a simple manner to a maximum temperature before entering the heat exchanger of the consumer. An absorption at a low temperature is an absorption by which the temperature of the acid leaving the absorber is not increased above the temperature of the cooling fluid (B) after the heat exchange with the consumer. The heating of the cooling fluid (B) with the cooling fluids (A) may be effected in a series arrangement—particularly if the cooling fluids (A) are at different temperatures—or the cooling fluids (B) is divided into partial streams, which are conducted in parallel through the two heat exchangers and are re-combined before the consumer.

According to a further preferred feature, the cooling fluid (B) before being heated with the sulfuric acid circulated through the interstage absorber is heated with the sulfuric acid circulated through the final absorber. In that case, the heat which becomes available at a relatively low temperature in the acid circulated through the end absorber can utilized too.

According to a further preferred feature, the pressurized water (B) which has been heated is subjected to an adiabatic pressure relief at the consumer and the resulting water vapor is condensed in the heat exchanger of the consumer. The adiabatic pressure relief is effected at the location of the consumer so that the path for the resulting water vapor is as short as possible. This results in a higher heat transfer rate than is obtained in case of a contact with pressurized water so that a smaller heating surface area of the consumer is sufficient or a consumer having a given heating surface area and using fluids which tend to form crusts can be operated for a longer time before the heating surfaces must be cleaned on the consumer side.

According to a further preferred feature, the adiabatic pressure relief of the pressurized water is effected in a plurality of stages, which are connected in series in the water cycle, and the water vapor produced in the several stages is separately condensed in separate condensers of consumers. In that case, a graduated use of the energy content of the pressurized water (B) is possible, partly at high temperature.

According to a further preferred feature, the heat exchangers of the consumer are connected in series and the heat-receiving fluid of the consumer flows through the heat exchangers in the direction of a rising temperature of the heat-receiving fluid and countercurrently to the fluid (B). Such use of the pressurized water (B) and the consumer fluid in countercurrent operation has the result that the pressurized water which has delivered energy to the consumer is at a much lower temperature than in case of a cocurrent operation so that important advantages are afforded regarding the reduction of the rate at which the pressurized water (B) be circulated by a pump and regarding the possibility to achieve higher concentrations of solutions in a consumer in which solutions are evaporated.

According to a further preferred feature, the condensate which becomes available in the heat exchanger of the consumer is collected and tested for purity and only when it is pure is it recycled to the cycle of the pressurized water (B). This ensures that in case of a leakage in the heat exchanger of the consumer only a relatively small quantity of condensate is contaminated and can be separately discarded whereas a major part of the pressurized water (B) is not endangered by such leakages and defects in the cycle of the pressurized water (B) are avoided.

According to a further preferred feature, the heat exchanger of the consumer is used to heat evaporators for increasing the concentration of aqueous solutions. Such aqueous solutions may particularly consist of solutions which contain sulfuric acid or phosphoric acid.

According to a further preferred feature, the heat exchanger of the consumer is preceded by a vapor compressor. As a result, the condensation temperature of the water vapor derived from the pressurized water (B) can be increased so that the heating surface area of the heat exchanger can be reduced or the temperature of the fluid on the consumer side can be increased.

BRIEF DESCRIPTION OF DRAWINGS

The invention will be explained more fully with reference to the appended drawings in which.

DESCRIPTION OF SPECIFIC EMBODIMENT

Figure 1:
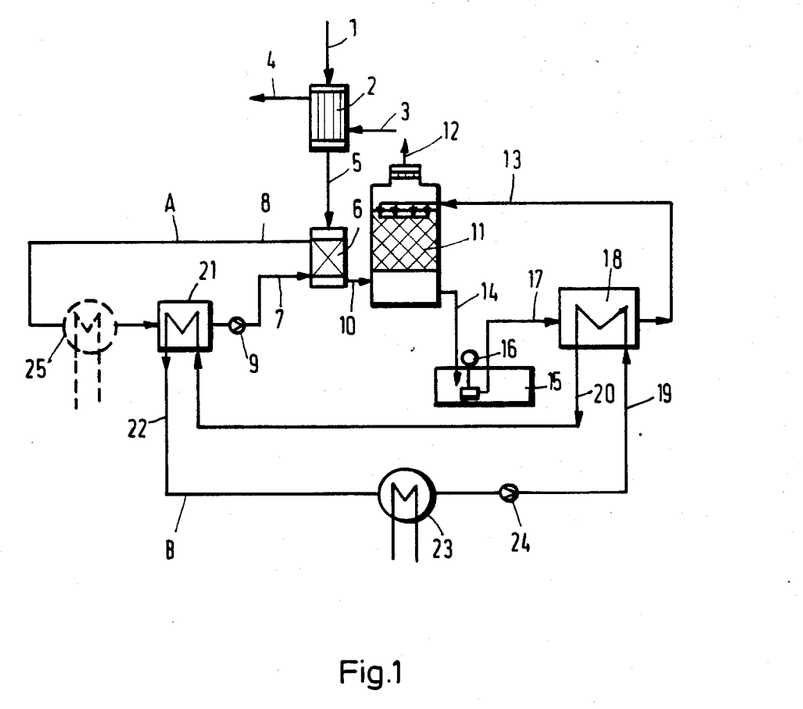
FIG. 1 is a diagrammatic representation of the procedure according to the invention as applied to an interstage or final absorber.

According to FIG. 1, the $SO_3$-containing gas is conducted through line 1 to the first indirect heat exchanger 2. A cooling fluid is supplied in line 3 and withdrawn in line 4. The precooled $SO_3$-containing gas is conducted through line 5 to the second indirect heat exchanger 6, which is supplied through line 7 with cooling fluid (A). The latter is withdrawn in line 8. The cooling fluid (A) is caused to flow in a closed cycle by a pump 9. The $SO_3$-containing gas is supplied in line 10 to the absorber 11, in which the $SO_3$ contained in the gas is absorbed. Thereafter, the gas is withdrawn from the absorber 11 in line 12. The concentrated sulfuric acid is injected into the absorber 11 from line 13 and is withdrawn in line 14 and fed to a receiving tank 15 and delivered from the latter by a pump 16 through line 17 and the indirect acid-cycle heat exchanger 18 to line 13. The cooling fluid (B) is conducted in line 19 to the heat exchanger 18 and from the latter in line 20 to the indirect heat exchanger 21 in the cycle of the cooling fluid (A) and flows from there in line 11 to the indirect heat exchanger 23 of the consumer and is then recycled by the pump 24 to line 19. If the pressurized water (A) is evaporated in the heat exchanger 6, the vapor will be condensed in the heat exchanger of the second consumer 25 and the hot condensate will then be supplied to the heat exchanger 21.

Figure 2:
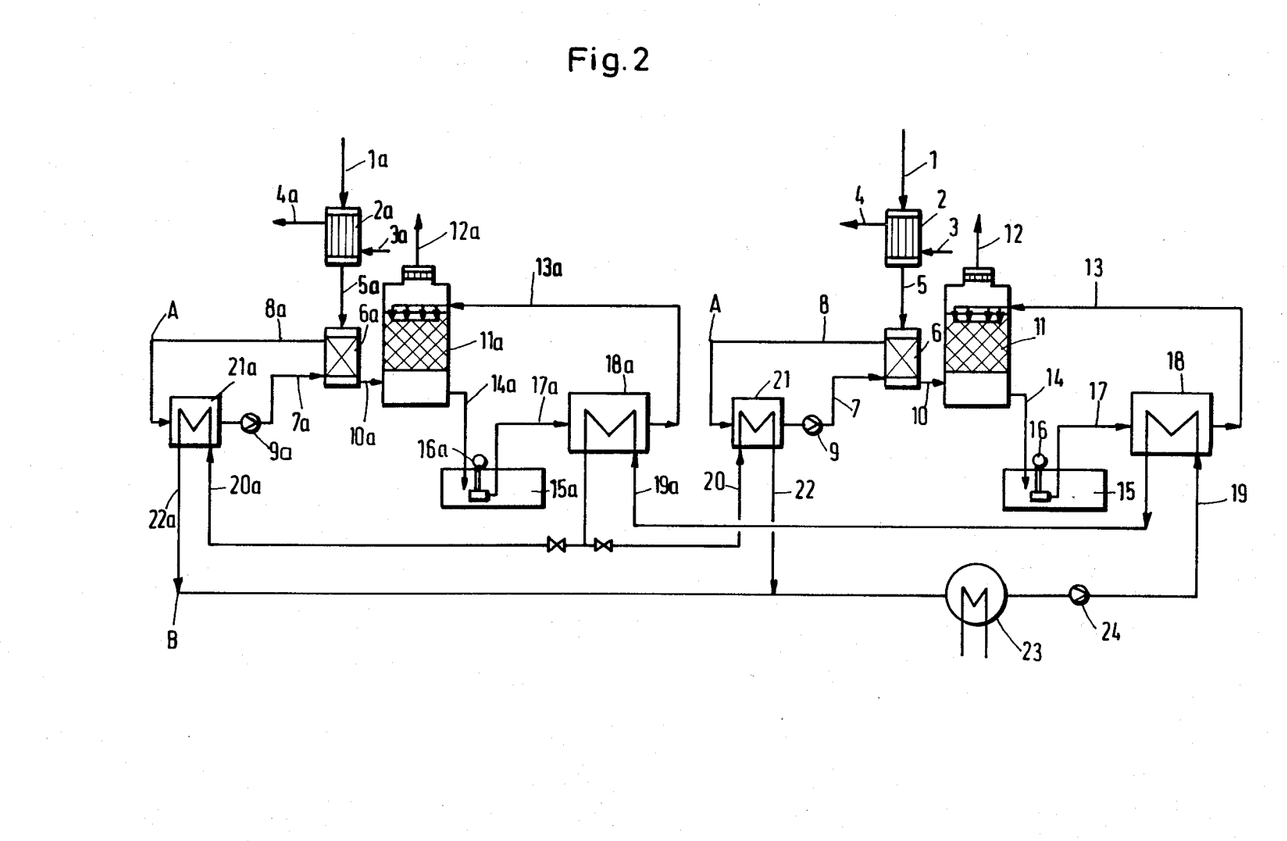
FIG. 2 is a diagrammatic representation showing the combined procedures applied to an interstage absorber and a final absorber. The cooling fluid (B) is conducted in two parallel partial streams, which are heated further by the cooling fluids (A) associated with the interstage absorber and with the end absorber.
Figure 3:
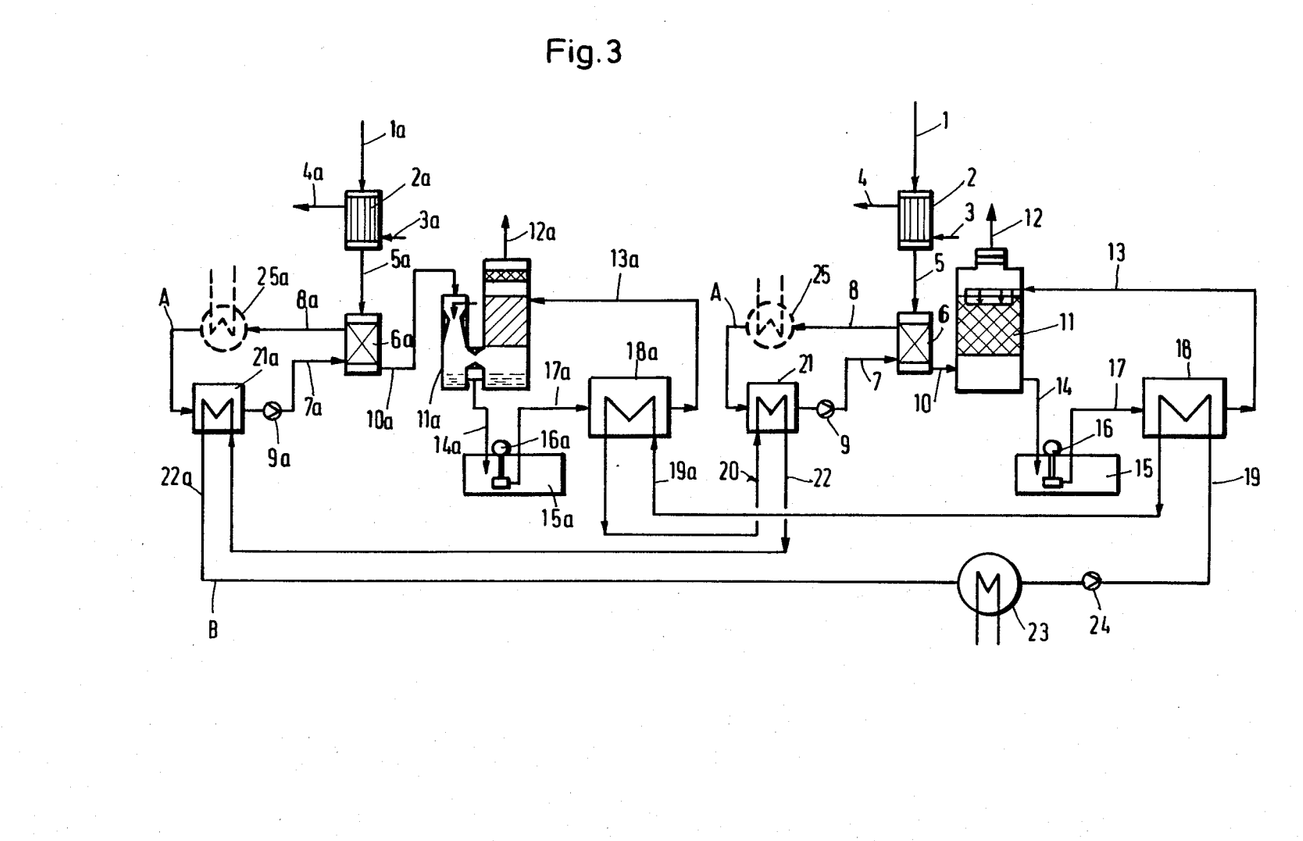
FIG. 3 is a diagrammatic representation of the combined procedures applied to an interstage absorber and a final absorber. The cooling fluid (B) is heated in succession by the cooling fluid (A) associated with the final absorber and thereafter by the cooling fluid (A) associated with the interstage absorber and the interstage absorption is effected in a venturi absorber, which is preferably used for a hot absorption in a cocurrent operation.

In FIGS. 2 and 3 the letter "a" has been added to the reference characters of the items which are associated with the interstage absorber whereas the reference characters having no added letter "a " relate to the items associated with the final absorber. The cooling fluid (B) handled by the pump 24 flows in line 19 to the acid-cycle heat exchanger 18 associated with the final absorber and then in line 19a to the acid-cycle heat exchanger 18a associated with the interstage absorber.

According to FIG. 2 one partial stream is conducted in line 20a to the heat exchanger 21a associated with the interstage absorber and the other partial stream is conducted in line 20 to the heat exchanger 21 associated with the final absorber. Both partial streams flowing in lines 22 and 22a are combined before entering the heat exchanger 23. It should be understood that in the embodiment of FIG. 2 the $SO_2$-containing gas is fed to an initial or subsequent conversion stage whose lines, pumps, indirect heat exchange etc. are designated by the letter "a" following the numeral. Unconverted $SO_2$ is reacted in a subsequent or final conversion stage whose flow scheme is designated in FIG. 2 without use of the letter "a". Thus, gases which become available in line 12a can be fed to a subsequent or final conversion stage reactant therein over a vanadium catalyst and withdrawn therefrom into line 1 for further processing.

According to FIG. 3, the cooling fluid (B) from the heat exchanger 18a is conducted in line 10 from the heat exchanger 18a to the indirect heat exchanger 21 in the cycle of cooling fluid (A), then in line 22 to the indirect heat exchanger 21a associated with the interstage absorber and then through line 22a to the heat exchanger 23 of the consumer and is subsequently recycled by the pump 24 to line 19.

Figure 4:
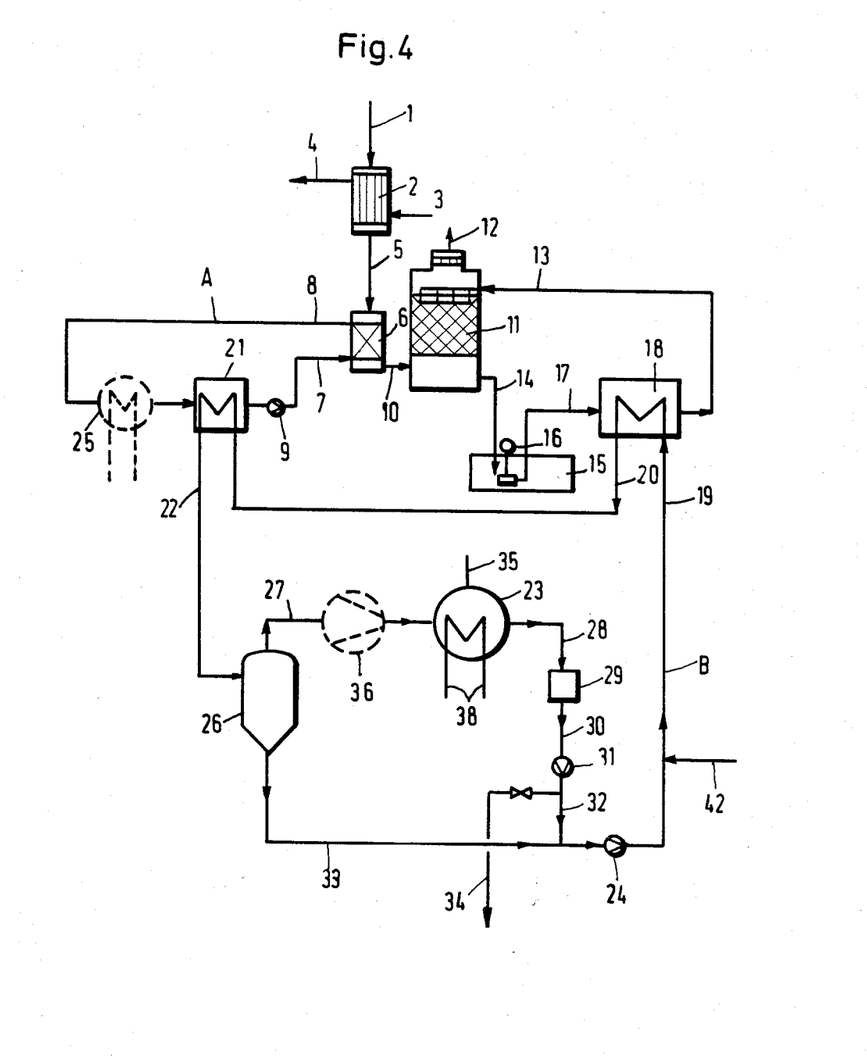
FIG. 4 is a supplement to FIG. 1 showing diagrammatically the procedure comprising an adiabatic pressure relief of the cooling fluid (B). The resulting water vapor is used to heat the consumer and the condensate derived from the water vapor is returned through a testing station to the cooled cooling fluid (B).

According to FIG. 4, the pressurized water which has been heated is delivered in line 22 to a pressure relief tank 26 and is subjected therein to an adiabatic pressure relief. The pressurized water leaving the pressure relief tank 26 in line 33 is delivered by the pump 24 through line 19 to the heat exchanger 18. The water vapor generated by the adiabatic expansion in the pressure relief tank 26 flows in line 27 to the consumer 23, which may be preceded by a vapor compressor 36 in line 27. The consumer 23 is vented by line 35. The resulting loss of water is compensated by make-up water supplied through line 42 to line 19. The condensate derived in the consumer 23 from the water vapor is conducted in line 28 to a purity tester 29, which may consist of a pH meter or a conductivity meter. The heat-receiving fluid 38 flows through the heat exchanger of the consumer 23. Condensate flows from the purity tester 29 through line 30, pump 31 and line 32 to line 33 of the pressurized water cycle, unless the condensate has been contaminated by leakage in the consumer 23. In that case the condensate is discarded through line 34.

Figure 5:
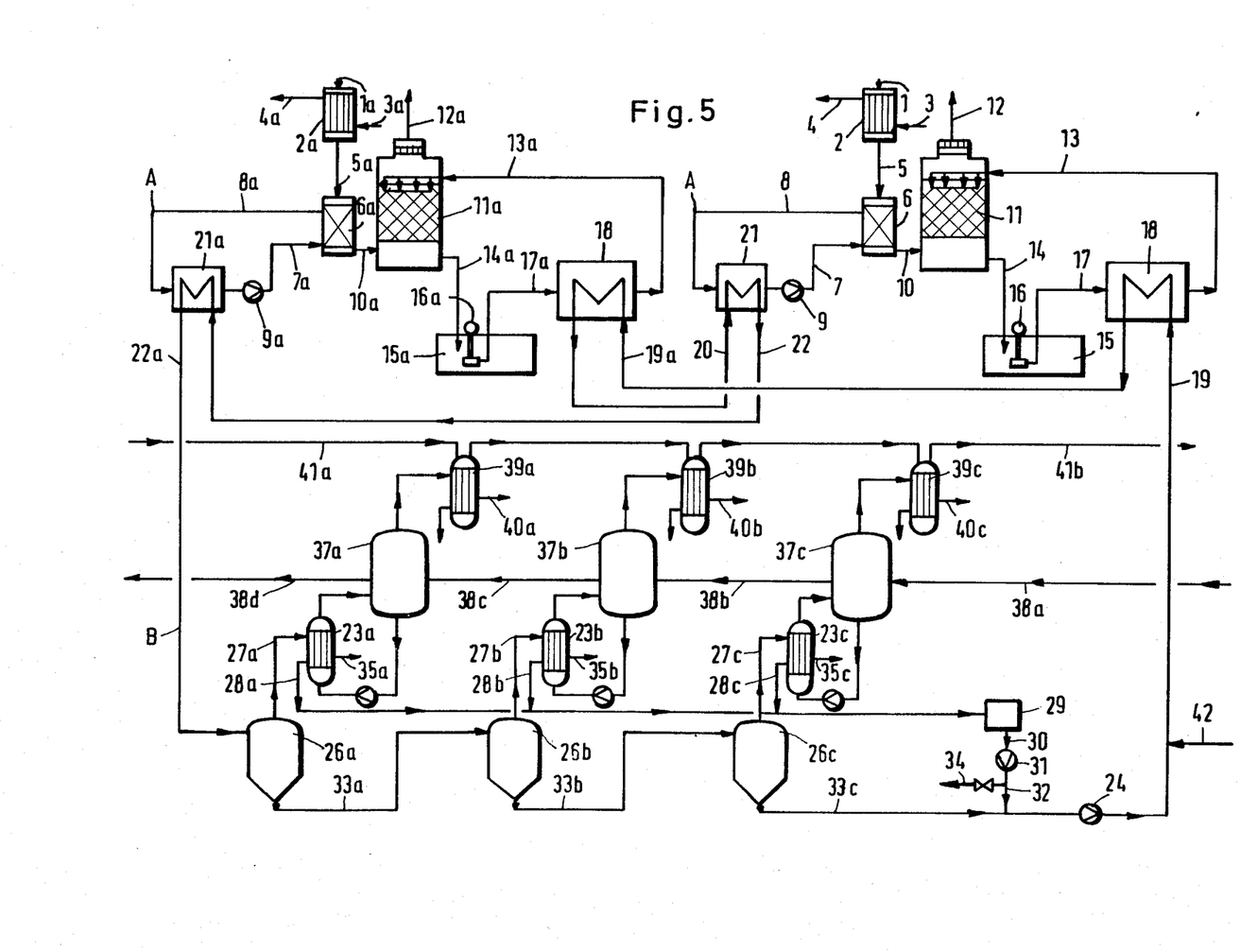
FIG. 5 is a supplement to FIG. 2 and shows diagrammatically the procedure comprising an adiabatic pressure relief of the pressurized water (B) in a plurality of series-connected stages and also shows the arrangement of the consumer.

FIG. 5 shows an arrangement comprising a plurality of stages for the pressurized water and for the consumer. Three stages are shown by way of example but a larger or smaller number of stages may be used and must be selected in each case. The pressurized water which has been heated leaves the heat exchanger 21a in line 22a and flows in succession through the pressure relief tanks 26a, 26b and 26c, which are interconnected by water lines 33a and 33b. From the last pressure relief tank 26c the pressurized water flows in line 33c to the pump 24, which delivers the cooled pressurized water through line 19 to the heat exchanger 18.

In the pressure relief tanks 26a, 26b and 26c the pressurized water is subjected to an adiabatic pressure relief. The resulting water vapor is fed in lines 27a, 27b and 27c to the heat exchangers 23a, 23b and 23c to heat the latter, which can function as heat exchangers of the consumer, are vented through lines 35a, 35b and 35c. To compensate for the wayer which is lost by the venting through lines 35a, 35b and 35c, make-up water is supplied through line 42 to line 19. The condensate derived from the water vapor in the heat exchanger 23a, 23b and 23c is withdrawn from said heat exchanger through lines 28a, 28b and 28c and is tested in the purity tester 29. When it is found that the condensate is pure, it is withdrawn from the purity tester 29 in line 30 and recycled by the pump 31 through line 32 to line 33c of the pressurized water cycle. Otherwise the condensate is discarded through line 34. The heat exchangers 23a, 23b and 23c are connected to evaporators 37a, 37b and 37c, which are flown through by an aqueous solution through pipelines 38a, 38b, 38c and 38d, in that order. The energy, supplied by water vapor condensation in the heat exchangers 23a, 23b and 23c, causes water vapor evaporation from the solution. For this purpose a suitable pressure is maintained in each of the evaporators 37a, 37b and 37c. The resulting water vapors are condensed in the water-cooled condensers 39a, 39b and 39c, which are vented through lines 40a, 40b and 40c. The cooling water is supplied in line 41a and withdrawn in line 41b. If the cooling water flows through the condensers in succession, it suitable flows in the order of 39a, 39b and 39c countercurrently to the solution and cocurrently with the pressurized water. If the pressurized water, the solution and the cooling water flow in said directions, a maximum utilization of the temperature gradient is achieved so that the heat exchanger surface areas can be small. This is due to the fact that the boiling point of the solution increases with its concentration.

EXAMPLES

Four Examples relating to FIGS. 1 to 3 are reported in Table 1. These Examples relate to plants for producing sulfuric acid at a rate of 1000 metric tons of $H_2SO_4$ per day.

Two Examples relating to FIGS. 4 and 5 are reported in Table II. These Examples relate to the design of the consumer.

Example 1 relates to a normal catalytic process, which is carried out in four contact process trays in a plant for processing gases from roasting, which become available at a low temperature and contain 8 vol. % $SO_2$.

Example 2 relates to a double catalytic process for processing hot gases which contain 10 vol. % $SO_2$ and have been obtained by a combustion of sulfur. The contact process system comprises three trays preceding and one tray succeeding an interstage absorber.

Example 3 relates to a double catalytic process for processing gases from roasting, which become available at a low temperature and contain 8 vol. % $SO_2$. The contact process system comprises three trays preceding and one tray succeeding an interstage absorber.

Example 4 relates to a double catalytic process for processing gases from roasting, which become available at a low temperature and contain 16 vol. % $SO_2$. The contact process system comprises three trays preceding and two trays succeeding an interstage absorber.

In Example 5 the usable heat energy supplied in pressurized water (B) is used to heat inorganic acid.

In Example 6 the usable heat energy supplied in pressurized water (B) is used to concentrate phosphoric acid in a plurality of stages from 27% $P_2O_5$ to 54% $P_2O_5$.

The advantages afforded by the invention reside mainly in that the temperature of the cooling fluid (B) can either be increased above the maximum temperature which can be reached in the acid-cycle heat exchanger or a given temperature can be achieved with a lower expenditure. Owing to the provision of the closed cooling cycle (A), the circulation rate of the cooling fluid can be automatically controlled so that a temperature drop below the dew point temperature before the adsorption of $SO_3$ will be reliably avoided even in case of a change in the operating conditions of the contact process plant. The acid-cycle heat exchanger may be operated at lower temperatures.

TABLE I

| Item | | Example No.<br>Figure No. | 1<br>1 | 2<br>2 | 3<br>3 | 4<br>3 |
|---|---|---|---|---|---|---|
| 1 | | Gas rate, m³ (STP)/h | 113,742 | 79,279 | 103,240 | 45,366 |
| | | $SO_3$-content, vol. % $SO_3$ | 8.2 | 0.7 | 0.6 | 0.7 |
| | | Gas temperature, °C. | 425 | 430 | 439 | 426 |
| 5 | | Gas temperature, °C. | 326 | 240 | 260 | 389 |
| 7 | | Cycle fluid | water | water/steam | water | water |
| | | Temperature, °C. | 140 | 120 | 130 | 130 |
| 8 | | Temperature, °C. | 160 | 130 | 160 | 160 |
| 10 | | Gas temperature, °C. | 160 | 140 | 140 | 140 |
| 13 | | $H_2SO_4$ temperature, °C. | 70 | 70 | 70 | 70 |
| 14 | | $H_2SO_4$ temperature, °C. | 90 | 90 | 90 | 90 |
| 19 | | Water temperature, °C. | 60 | 60 | 60 | 60 |
| 19a | | Water temperature, °C. | | 67 | 78 | 77 |
| 20 | | Water temperature, °C. | 83 | 102 | 120 | 120 |
| 22 | | Water temperature, °C. | 94 | 110 | 136 | 137 |
| 1a | | Gas rate, m³ (STP)/h | — | 88,905 | 111,283 | 45,924 |
| | | $SO_3$ content, vol. % $SO_3$ | — | 9.9 | 7.8 | 15.2 |
| | | Gas temperature, °C. | — | 475 | 470 | 530 |
| 5a | | Gas temperature, °C. | — | 198 | 222 | 379 |
| 7a | | Cycle fluid | — | water/steam | water | water |
| | | Temperature, °C. | — | 130 | 150 | 150 |
| 8a | | Temperature, °C. | — | 140 | 180 | 180 |
| 10a | | Gas temperature, °C. | — | 160 | 160 | 170 |
| 12a | | Gas temperature, °C. | — | 90 | 140 | 140 |
| 13a | | $H_2SO_4$ temperature, °C. | — | 90 | 120 | 120 |
| 14a | | $H_2SO_4$ temperature, °C. | — | 110 | 140 | 140 |
| 20a | | Water temperature, °C. | — | 102 | — | — |
| 22a | | Water temperature, °C. | — | 110 | 146 | 158 |
| 23 | | Heat rate, GJ/h | 87 | 87 | 78 | 80 |

TABLE II

| Item | | Example No.<br>Figure No. | 5<br>4 | 6<br>5 |
|---|---|---|---|---|
| 22 | | Cycle fluid | water | — |
| | | Temperature, °C. | 94 | — |
| 33 | | Temperature, °C. | 60 | — |
| 27 | | Temperature, °C. | 60 | — |
| 28 | | Temperature, °C. | 60 | — |
| 38 | | Heated fluid | inorganic acid | — |
| | | Temperature rise of fluid, °C. | 35 | — |
| 23 | | Heat rate, GJ/h | 87 | — |
| 22a | | Cycle fluid | — | water |
| | | Temperature, °C. | — | 110 |
| 33a | | Temperature, °C. | — | 91.9 |
| 33b | | Temperature, °C. | — | 71.9 |
| 33c | | Temperature, °C. | — | 60 |
| 38a | | Aqueous solution | — | phosphoric acid |
| | | Concentration, % $P_2O_5$ | — | 27 |
| | | Temperature, °C. | — | 50 |
| 38b | | Temperature, °C. | — | 50 |
| 38c | | Temperature, °C. | — | 55 |
| 38d | | Concentration, % $P_2O_5$ | — | 54 |
| | | Temperature, °C. | — | 76.5 |
| 30 | | Fluid | — | condensate |
| | | Temperature, °C. | — | 60 |
| 41a | | Fluid | — | cooling water |
| | | Temperature, °C. | — | 23 |
| 41b | | Temperature, °C. | — | 33 |
| 23a + 23b + 23c | | Heat rate, GJ/h | — | 87 |

What is claimed is:
1. A process for producing sulfuric acid from $SO_2$-containing gases comprising catalytically reacting $SO_2$ to $SO_3$, cooling the $SO_3$-containing gases in multi-stages and thereafter absorbing SO$_3$ in concentrated sulfuric acid which is circulated through an absorber to which said SO$_3$-containing gases are fed, comprising the following steps:

(a) initially cooling the SO$_3$-containing gases before entering the absorber by an indirect heat exchange, (b) subsequently cooling the gases of step (a) to a temperature slightly above the dew point temperature of the SO$_3$-containing gases by an indirect heat exchange with a first cooling fluid (A), which is conducted in a closed cycle, (c) cooling the sulfuric acid circulating through said absorber by an indirect heat exchange with a second liquid cooling fluid (B), which is conducted in a second closed cycle, (d) further heating the second liquid cooling fluid (B) which has been heated in step (c) by an indirect heat exchange with the heated first cooling fluid (A) of step (b); and (e) cooling the resultant hot second cooling fluid (B) of step (d) by an indirect heat exchange with a consumer.

2. A process according to claim 1, wherein the second liquid cooling fluid (B) comprises pressurized water.

3. A process according to claim 1, wherein the first cooling fluid (A) comprises pressurized water.

4. A process according to claim 3, wherein the pressurized water used as the first cooling fluid (A) is entirely evaporated by the indirect heat exchange and the steam is condensed by the indirect heat exchange with cooling fluid (B).

5. A process according to claim 3, wherein the pressurized water used as first cooling fluid (A) is entirely evaporated by the indirect heat exchange, the steam is condensed by a heat exchange with a second consumer, and the hot condensate is used to further heat the second cooling fluid (B).

6. A process according to claim 1, wherein the first cooling fluid (A) is supplied at a temperature of 120° to 180° C. to the indirect heat exchange with the SO$_3$-containing gases and is conducted countercurrently to the latter.

7. A process according to claim 1, wherein SO$_3$-containing gases are absorbed in an interstage absorber, unabsorbed SO$_2$-containing gases are converted in a subsequent reaction stage to additional SO$_3$-containing gases which are absorbed by sulfuric acid in a final absorber, sulfuric acid is circulated through said interstage absorber to absorb SO$_3$-containing gases, second cooling fluid (B) is passed in heat exchange with said sulfuric acid circulated through said interstage absorber, first cooling fluid (A) is passed in indirect heat exchange with said additional SO$_3$ containing gases, a third cooling fluid is passed in indirect heat exchange with SO$_3$-containing gases upstream of said interstage absorber and said second cooling fluid (B) is heated by indirect heat exchange with said first cooling fluid (A) and said third cooling fluid.

8. A process according to claim 7, wherein the cooling fluid (B) before being heated with the sulfuric acid circulated through the interstage absorber is heated with sulfuric acid circulated through the final absorber.

9. A process according to claim 2, wherein the pressurized water (B) which has been heated is subjected to an adiabatic pressure relief at the consumer, the consumer comprises a heat exchanger, and the resulting water vapor is condensed in the heat exchanger of the consumer.

10. A process according to claim 9, wherein adiabatic pressure relief of the pressurized water is effected in a plurality of stages each of which stages comprises adiabatically pressure relieving pressurized water, passing the resultant vapors to a condenser of a consumer and condensing the same, which stages are connected in series.

11. A process according to claim 10, wherein said condensers form heat exchangers of the respective consumers and are connected in series, a heat-receiving fluid of the consumer flow through the heat exchangers in the direction of a rising temperature of the heat-receiving fluid and counter-currently to the second cooling fluid (B).

12. A process according to claim 9, wherein the condensate which becomes available in the heat exchanger of the consumer is collected and tested for purity and only when it is pure is recycled to the cycle of the pressurized water (B).

13. A process according to claim 9, wherein the heat exchanger of the consumer is used to heat at least one evaporator for increasing the concentration of an aqueous solution.

14. A process according to claim 9, wherein the vapors from the adiabatic pressure relief are sent to a vapor compressor prior to the heat exchanger of the consumer.

15. A process according to claim 13, wherein said aqueous solution is a solution of sulfuric acid.

16. A process according to claim 13, wherein said aqueous solution is a solution of phosphoric acid.

17. A process according to claim 13, wherein said aqueous solution is a solution of an inorganic acid.

18. A process according to claim 7, wherein the final absorption is effected such that the temperature of the acid leaving the final absorber is not increased above the temperature of said second cooling fluid (B) after said second cooling fluid (B) has been heat exchanged with the consumer.

19. A process according to claim 18, wherein the first cooling fluid is at a temperature different from said third cooling fluid.

20. A process according to claim 8, wherein said second cooling fluid (B) after being heated with sulfuric acid in the interstage absorber is split into a first stream and a second stream, said first stream is passed in indirect heat exchange with said third cooling liquid, said second stream is passed in indirect heat exchange with said first cooling fluid (A) and thereafter the so exchanged first and second streams are re-joined upstream of said consumer.

* * * * *